US010330853B2

(12) United States Patent
Zhu (10) Patent No.: US 10,330,853 B2
(45) Date of Patent: Jun. 25, 2019

(54) LIGHT-GUIDING PANEL, BACKLIGHT MODULE, AND DISPLAY DEVICE

(71) Applicant: BOE TECHNOLOGY GROUP CO., LTD., Beijing (CN)

(72) Inventor: Lin Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/534,453

(22) PCT Filed: Jan. 6, 2017

(86) PCT No.: PCT/CN2017/070414
§ 371 (c)(1),
(2) Date: Jun. 8, 2017

(87) PCT Pub. No.: WO2018/000805
PCT Pub. Date: Jan. 4, 2018

(65) Prior Publication Data
US 2018/0003883 A1   Jan. 4, 2018

(30) Foreign Application Priority Data
Jul. 1, 2016   (CN) .......................... 2016 1 0515752

(51) Int. Cl.
*F21V 8/00*   (2006.01)

(52) U.S. Cl.
CPC ........... *G02B 6/0051* (2013.01); *G02B 6/005* (2013.01); *G02B 6/0031* (2013.01);
(Continued)

(58) Field of Classification Search
CPC ..... G02B 6/0051; G02B 6/0031; G02B 6/005
(Continued)

(56) References Cited

U.S. PATENT DOCUMENTS 7,407,317 B2 *   8/2008   Lee ...................... G02B 6/0053
                                                      362/332
8,596,818 B2 *  12/2013   Lee .................... G02F 1/133606
                                                      362/244
(Continued)

FOREIGN PATENT DOCUMENTS

CN    101329423 A    12/2008
CN    203286399 U    11/2013
(Continued)

OTHER PUBLICATIONS

The World Intellectual Property Organization (WIPO) International Search Report for PCT/CN2017/070414 dated Mar. 31, 2017
(Continued)

*Primary Examiner* — Bryon T Gyllstrom
(74) *Attorney, Agent, or Firm* — Westerman, Hattori, Daniels & Adrian, LLP (57) ABSTRACT

Light-guiding panel, backlight module, and a display device are provided. An exemplary light-guiding panel includes a light-guiding body and a light diffusing-transmitting layer over the light-guiding body. The light-guiding body is configured to reflect incident light beams on a first side surface of the light-guiding body, thereby providing reflected light beams to the light diffusing-transmitting layer. The light diffusing-transmitting layer is capable of diffusing and transmitting the reflected light beams.

19 Claims, 9 Drawing Sheets

(52) U.S. Cl.
CPC ............ *G02B 6/0038* (2013.01); *G02B 6/003* (2013.01); *G02B 6/0061* (2013.01)

(58) Field of Classification Search
USPC ........................................................ 362/607
See application file for complete search history.

(56) References Cited

U.S. PATENT DOCUMENTS

| | | | |
|---|---|---|---|
| 8,794,810 B2 * | 8/2014 | Park .................... | G02B 6/003 362/608 |
| 8,834,000 B2 * | 9/2014 | Kim ..................... | G09F 3/14 362/609 |
| 2003/0026585 A1 * | 2/2003 | Iimura ................. | G02B 6/02 385/144 |
| 2003/0043315 A1 | 3/2003 | Umemoto et al. | |
| 2004/0032659 A1 * | 2/2004 | Drinkwater ........... | F21V 33/006 359/558 |
| 2007/0171676 A1 * | 7/2007 | Chang .................. | G02B 6/0046 362/613 |
| 2007/0201246 A1 * | 8/2007 | Yeo ...................... | G02B 6/0051 362/627 |
| 2008/0266896 A1 * | 10/2008 | Chang .................. | G02B 6/0036 362/606 |
| 2010/0067257 A1 * | 3/2010 | Meis .................... | G02B 5/0841 362/624 |
| 2012/0113679 A1 * | 5/2012 | Boonekamp ......... | G02B 6/0063 362/607 |

FOREIGN PATENT DOCUMENTS

| | | |
|---|---|---|
| CN | 103925524 A | 7/2014 |
| CN | 105911637 A | 8/2016 |
| CN | 205880269 U | 1/2017 |

OTHER PUBLICATIONS

State Intellectual Property Office of the P.R.C (SIPO) Office Action 1 for 201610515752.0 dated Feb. 14, 2016 7 Pages. (including translation).

Office Action dated Oct. 24, 2018, issued in counterpart Chinese Application No. 201610515752.0, with English translation. (8 pages).

* cited by examiner

LIGHT-GUIDING PANEL, BACKLIGHT MODULE, AND DISPLAY DEVICE

CROSS-REFERENCE TO RELATED APPLICATION

This application is a national phase entry under 35 U.S.C. § 371 of International Application No. PCT/CN2017/070414, filed on Jan. 6, 2017, which claims priority to Chinese Patent Application No. 201610515752.0, filed Jul. 1, 2016, the entire contents of both of which are incorporated herein by reference.

TECHNICAL FIELD

The present disclosure generally relates to display technology, more particularly, relates to a light-guiding panel, a backlight module containing the light-guiding panel, and a display device containing the backlight module.

BACKGROUND

Display devices with adjustable viewing angle functions can provide different viewing angles to meet the viewing needs of different users. For example, a display device with adjustable viewing angle may provide two viewing modes, i.e., a private viewing mode and a normal viewing mode. In a private viewing mode, the viewing angle of the display device is sufficiently narrow to prevent people nearby from viewing the content displayed on the display device. In a normal viewing mode, the viewing angle of the display device is sufficiently wide to allow people to view the content displayed on the display device from a sufficiently large viewing angle.

A display device with adjustable viewing angle functions often includes a backlight module, a switchable diffuser, and a display panel. Problems arise, however, as the size of display devices increases, the area of the switchable diffuser keeps increasing accordingly. As a result, the fabrication cost of the display device can be undesirably increased.

SUMMARY

One aspect of the present disclosure provides a light-guiding panel. The light-guiding panel includes a light-guiding body; and a light diffusing-transmitting layer over the light-guiding body. The light-guiding body is configured to reflect incident light beams on a first side surface of the light-guiding body, thereby providing reflected light beams to the light diffusing-transmitting layer. The light diffusing-transmitting layer is capable of diffusing and transmitting the reflected light beams.

Optionally, the incident light beams on the light-guiding body are substantially parallel; the reflected light beams from the light-guiding body are substantially parallel; and the light diffusing-transmitting layer includes: a plurality of diffuser stripes, configured to scatter a portion of the reflected substantially parallel light beams to form non-collimated light beams, and a spacing between adjacent diffuser stripes, configured to transmit a portion of the reflected substantially parallel light beams to form collimated light beams.

Optionally, the diffuser stripe has one of a straight shape and a zigzag shape.

Optionally, a light-emitting surface of the light-guiding body includes a reflective structure, the reflective structure includes a plurality of protruding stripes arranged in parallel along an incident direction of the incident light beams, and the protruding stripe includes a first sloped surface configured for reflecting the incident light beams to the diffuser stripes.

Optionally, heights of the plurality of protruding stripes alter along the incident direction of the incident light beams.

Optionally, the protruding stripe includes a second sloped surface configured to reflect incident light beams, incident on a second side surface thereof, to the spacing between adjacent diffuser stripes, and the first sloped surface and the second sloped surface are arranged on opposite sides of the protruding stripe.

Optionally, the light-guiding panel further includes: a filler layer over the light-guiding body. The plurality of diffuser stripes is disposed on the filler layer.

Optionally, the diffuser stripe includes at least one multi-stable liquid crystal (LC) diffuser stripe, the at least one multi-stable LC diffuser stripe being arranged in parallel with one another.

Optionally, the diffuser stripe includes a plurality of mesh-shaped grooves arranged in a stripe-shaped region on a light-emitting surface of the filler layer.

Optionally, the light-guiding panel further includes a plurality of lens structures arranged on a side of the light-guiding body.

Another aspect of the present disclosure provides a backlight module including the disclosed light-guiding panel.

Optionally, the backlight module further includes: a first lighting bar on one side of the light-guiding panel, and a plurality of optical members, configured to convert light emitted from the first lighting bar to be substantially parallel, incident on the first side surface of the light-guiding body.

Optionally, the backlight module further includes: a second lighting bar on another side of the light-guiding panel, and a plurality of optical members, configured to convert light emitted by the second lighting bar to be substantially parallel, incident on a second side surface of the light-guiding body. The protruding stripe includes a second sloped surface configured to reflect the incident light beams, incident on the second side surface of the light-guiding body to a spacing between adjacent diffuser stripes.

Optionally, the backlight module further includes: a controller, configured to receive a control signal, the control signal being configured to control on and off states of the first lighting bar and the second lighting bar.

Optionally, the backlight module further includes: a filler layer over the light-guiding body to provide a substantially flat surface for the plurality of diffuser stripes to be disposed thereon.

Optionally, the diffuser stripe includes at least one multi-stable liquid crystal (LC) diffuser stripe, the at least one multi-stable LC diffuser stripe being arranged in parallel with one another.

Optionally, the controller is configured to control the diffuser stripe to switch between a transparent state and a scattering state.

Optionally, the diffuser stripe includes a plurality of mesh-shaped grooves arranged in a stripe-shaped region on a light-emitting surface of the filler layer.

Optionally, the optical members are lens structures arranged one side surface of the light-guiding body.

Another aspect of the present disclosure provides a display device including one of the disclosed light-guiding panel and the disclosed backlight module.

BRIEF DESCRIPTION OF THE FIGURES

The following drawings are merely examples for illustrative purposes according to various disclosed embodiments and are not intended to limit the scope of the present disclosure.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Display devices may provide adjustable viewing angle functions. For example, a switchable diffuser may often be used in a display device, e.g., sandwiched between a backlight module and a display panel. The backlight module provides backlight for the display panel. The switchable diffuser can switch between a transparent state and a scattering state. When in the transparent state, the switchable diffuser does not alter the transmission direction of the backlight so that backlight with a narrow viewing angle is obtained and private viewing function can be implemented. When in the scattering state, the switchable diffuser scatters the backlight to obtain backlight with a wide viewing angle to provide normal viewing function.

The present disclosure provides a light-guiding panel, a backlight module, and a display device. An exemplary light-guiding panel includes a light-guiding body and a light diffusing-transmitting layer over the light-guiding body. The light-guiding body is configured to reflect the incident light beams that are incident on a first side surface of the light-guiding body, to provide the light diffusing-transmitting layer with reflected light beams. The light diffusing-transmitting layer is configured to diffuse or transmit the reflected light beams.

In various embodiments, the incident light beams on the light-guiding body may be parallel light beams, and the reflected light beams obtained from the light-guiding body and directed to the light diffusing-transmitting layer may also be parallel light beams.

As used herein, the term "parallel light beams" may refer to light beams that are substantially parallel, e.g., having a sufficiently-small scattering angle with one another. For example, the sufficiently-small scattering angle between light beams may be less than about 15 degrees, or less than about 10 degrees, or less than about 5 degrees, or less than about 1 degree, according to various embodiments of the present disclosure.

In various embodiments, the incident light beams may also be referred to as parallel light beams, while the reflected light beams may also be referred to as reflected parallel light beams.

In one embodiment, the light diffusing-transmitting layer may include a plurality of diffuser stripes, separated by a spacing between adjacent diffuser stripes. In one embodiment, parallel light beams may be reflected to the diffuser stripes or the spacing and treated differently to provide collimated light beams and the non-collimated light beams. In another embodiment, parallel light beams reflected to the diffuser stripes to provide collimated light beams and the non-collimated light beams. In this manner, a viewing angle range of the display device may be adjusted.

Figure 1:
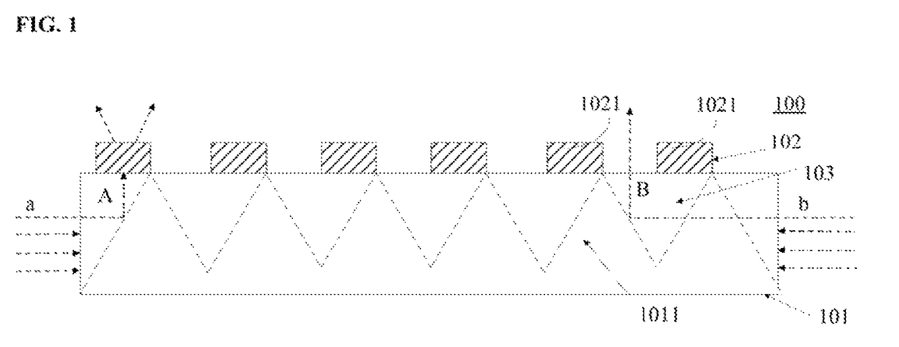
FIG. 1 illustrates an exemplary light-guiding panel according to various disclosed embodiments of the present disclosure.
Figure 2A:
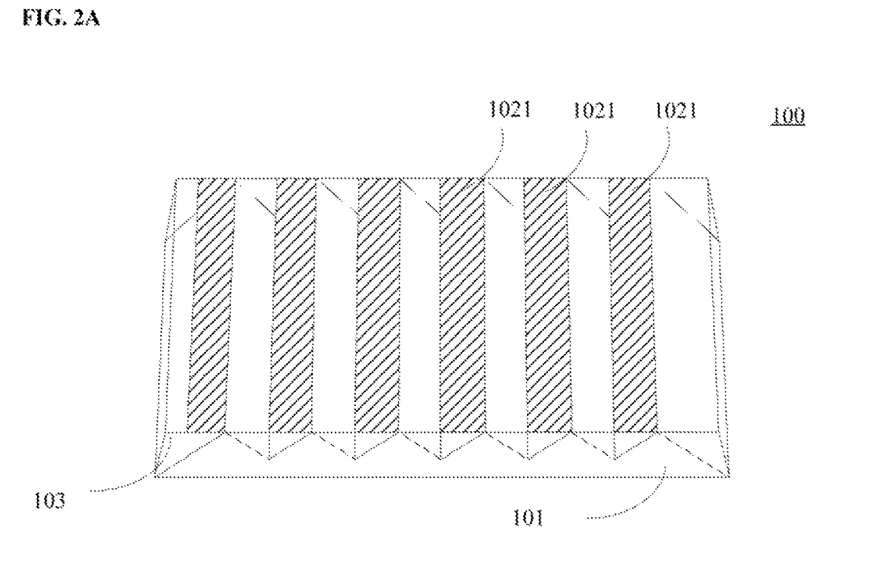
FIG. 2A illustrates a structure of the exemplary light-guiding panel depicted in FIG. 1 according to various disclosed embodiments of the present disclosure.
Figure 2B:
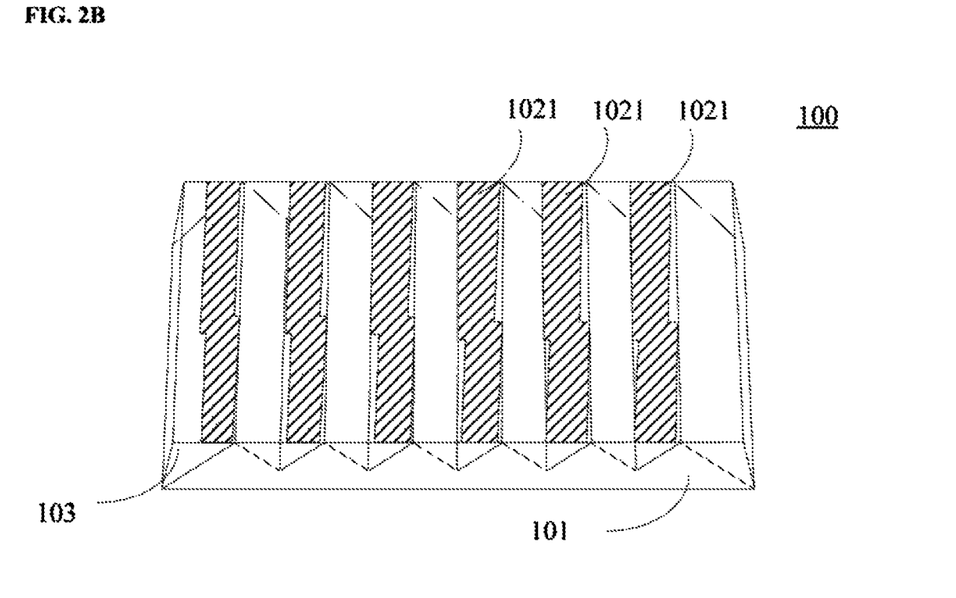
FIG. 2B illustrates another structure of the exemplary light-guiding panel depicted in FIG. 1 according to various disclosed embodiments of the present disclosure.

FIG. 1 illustrates an exemplary light-guiding panel 100 provided by the present disclosure. FIGS. 2A and 2B illustrate two three-dimensional views of the light-guiding panel 100 depicted in FIG. 1. As shown in FIGS. 1, 2A, and 2B, the light-guiding panel 100 may include a light-guiding body 101 and a light diffusing-transmitting layer 102 disposed on the light-guiding body 101.

The light diffusing-transmitting layer 102 may include a plurality of separately arranged diffuser stripes 1021. In one embodiment, each diffuser stripe 1021 may be separated from an adjacent diffuser stripe 1021, e.g., by a spacing there-between having a width along a direction perpendicular to a length direction or a longitudinal direction of the stripes. In one embodiment, such spacing width is substantially the same as a width of each stripe, although any width may be included in the present disclosure between any adjacent diffuser stripes.

The light-guiding body 101 may reflect or direct the parallel light beams incident on a side surface of the light-guiding body 101 to the light diffusing-transmitting layer 102. For example, light beams "a" and "b" shown in FIG. 1, illustrated by the dashed arrows, may represent the parallel light beams incident on the left side surface and on the right side surface, respectively.

Light beams "A" and "B", also illustrated by the dashed arrows, may represent light beams formed by the reflection of parallel light beams "a" and "b", respectively. For illustrative purposes, a light beam formed after the reflection of a parallel light beam may be referred to as a reflected parallel light beam. The diffuser stripes 1021 may, when illuminated by a reflected parallel light beam, e.g., light beam "A" or "B", diffuse the reflected parallel light beams or transmit the reflected parallel light beams. For example, the reflected parallel light beam "A" may be scattered and/or transmitted by the diffuser stripes 1021.

For example, the spacing between two adjacent diffuser stripes 1021 may be used to transmit the reflected parallel light beams, without altering the transmission direction of the reflected parallel light beams, when illuminated by the reflected parallel light beams. As shown in FIG. 1, the reflected parallel light beam "B" may be transmitted through the spacing between two diffuser stripes 1021, as shown in FIG. 1.

In the present disclosure, by arranging a light diffusing-transmitting layer 102 on the light-guiding body 101, the light-guiding body 101 may reflect or direct parallel light beams transmitted through the side surfaces to the light diffusing-transmitting layer 102 through a reflective structure. The reflective structure may be on a light-emitting surface of the light-guiding body. The light diffusing-transmitting layer 102 may include a plurality of separately arranged diffuser stripes 1021. The diffuser stripes 1021 may be parallel to each other, and two adjacent diffuser stripes 1021 may be separated by certain spacing. In some embodiments, by reflecting the parallel light beams to the diffuser stripes 1021 or to the spacing between two adjacent diffuser stripes 1021, parallel light beams may be processed differently, such that collimated light beams and non-collimated light beams may be formed. The collimated light beams and the non-collimated light beams may be used to adjust the viewing angles of the display device.

In one embodiment, as shown in FIG. 1, when a parallel light beam "a" is incident on a side surface of the light-guiding body 101, the reflected parallel light beam "A" may exit the reflective structure and may be diffused/scattered and emitted by a corresponding diffuser stripe 1021 to form a non-collimated light beam.

When a parallel light beam "b" is incident on a side surface of the light-guiding body 101, the reflected parallel light beam "B" may be transmitted and emitted through a corresponding spacing between diffuser stripes 1021 to form a collimated light beam exiting the light diffusing-transmitting layer.

In some other embodiments, parallel light beams may be reflected to the diffuser stripes 1021. The light diffusing-transmitting layer 102 may process the reflected parallel light beams differently through the diffuser stripes 1021, to form and emit collimated light beams and non-collimated light beams. The collimated light beams and the non-collimated light beams may be used to adjust the viewing angle range of the display device. In the abovementioned structure for adjusting the viewing angle range of a display device, the light diffusing-transmitting layer 102 may be formed through a plurality of separately arranged diffuser stripes 1021. Compared to conventional technology, the disclosed light diffusing-transmitting layer may have a smaller total area and can be fabricated at a lower cost.

As shown in FIG. 2A, in one embodiment, the plurality of diffuser stripes 1021 may each be a straight stripe, having a consistent width along its length direction. The plurality of diffuser stripes 1021 may be parallel to each other along the entire length of the stripes 1021.

In other embodiments of the present disclosure, the diffuser stripes may also have other suitable shapes, e.g., a curved shape or a zigzag shape. For example, as shown in FIG. 2B, a diffuser stripe 1021 may have a zigzag shape or a broken-line shape. Two adjacent diffuser stripes 1021 may be separately arranged. In this case, the diffuser stripe may not be a straight stripe, for example, along the entire length of the diffuser stripes.

In some embodiments, the light-guiding panel 100 may further include a filler layer 103 disposed on the reflective structure 1011. The diffuser stripes 1021 may be arranged on the filler layer 103. The filler layer 103 may fix the diffuser stripes 1021 in place.

The filler layer 103 may have any suitable shapes. For example, as shown in FIG. 1, the filler layer 103 may have a shape having a bottom surface capable of complementarily matching the top surface of the light-guiding body 101, and also having a top surface with sufficient flatness. In one embodiment, the filler layer 103 may be used as a filler to fill out the top surface of the light-guiding body 101 to provide the top surface has sufficient flatness.

For example, when the top surface of the light-guiding body 101 provides triangle-shaped structures, the filler layer 103 may include a plurality of inverted triangle-shaped structure connected together to fill out those triangle-shaped structures of the light-guiding body 101. In the meanwhile, the top surface of the light-guiding body 101 may be sufficiently flat. The specific shape of the filler layer 103 should not be limited in the present disclosure according to various embodiments disclosed herein.

In the light-guiding panel 100 provided in FIG. 1, a diffuser stripe 1021 may be a multi-stable liquid crystal (LC) diffuser stripe. The light-guiding body 101 may be made of a suitable material such as glass and/or poly(methyl methacrylate) (PMMA). The filler layer 103 may be made of, e.g., polyethylene terephthalate (PET).

Figure 3A:
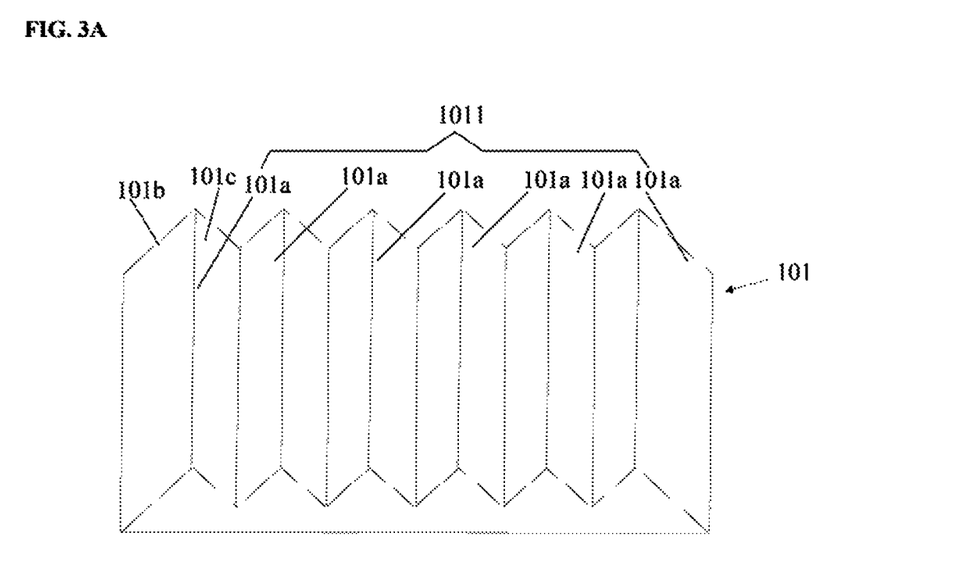
FIG. 3A illustrates an exemplary light-guiding body in the exemplary light-guiding panel depicted in FIG. 2A and FIG. 2B according to various disclosed embodiments of the present disclosure.

FIG. 3A illustrates the structure of the light-guiding body 101 shown in FIG. 2A. As shown in FIG. 3A, the light-emitting surface of the light-guiding body 101 may include a reflective structure 1011. The reflective structure 1011 may include a plurality of protruding stripes 101a arranged in parallel along an incident direction of the parallel light beams. A protruding stripe 101a may include a first sloped surface 101b. The first sloped surface 101b may reflect a parallel light beam, incident on one side surface of the light-guiding body 101, to the diffuser stripes 1021. The plurality of protruding stripes 101a may form the reflective structure 1011, and a protruding stripe 101a may include a first sloped surface 101b that can reflect a parallel light beam to the diffuser stripes 1021. The design and/or arrangement of the reflective structure 1011 may meet the requirements for reflecting parallel light beams. The design and fabrication of the reflective structure 1011 may be more convenient.

A diffuser stripe 1021 may at least partially block a first sloped surface 101b of a protruding stripe 101a. As shown in FIG. 1, in one embodiment, a diffuser stripe 1021 may fully block the first sloped surface 101b of a protruding stripe 101a, such that light incident on a first sloped surface 101b may be reflected on and fully scattered through a corresponding diffuser stripe.

In other various embodiments, a diffuser stripe 1021 may block only a portion of the first sloped surface 101b of a protruding stripe 101a, such that light incident on a first sloped surface 101b may be reflected on and partially scattered through a corresponding diffuser stripe and partially transmitted through the spacing between two adjacent diffuser stripes.

In some embodiments, a protruding stripe 101a may further include a second sloped surface 101c. A second sloped surface 101c may reflect a parallel light beam, incident on another side surface of the light-guiding body 101, to the spacing between two adjacent diffuser stripes 1021. A first sloped surface 101b and a second sloped surface 101c may be arranged on two opposite sides of a protruding stripe 101a. By arranging two sloped surface, each on one of the two opposite sides of a protruding stripe 101a, light beams incident on the two side surfaces of the light-guiding body 101 may be properly reflected.

In one embodiment, the protruding stripe 101a having the first sloped surface 101b and the second sloped surface 101c may provide at least a portion of a triangle. As shown in FIG. 3A, the cross section of a protruding stripe 101a, having a structure as described above, may be an acute triangle.

In certain embodiments, a protruding stripe 101a in the light-guiding body 101 may only include a first sloped surface 101b. Accordingly, the cross section of the protruding stripe 101a may be a right triangle.

Further, in the light-guiding body 101 illustrated in FIG. 3A, two adjacent diffuser stripes 1021 may be separated by the spacing with a same width or distance. In other various embodiments, the distance between two adjacent diffuser stripes 1021 may also be different. The specific arrangement of the diffuser stripes 1021 may be determined according to different applications and/or designs and should not be limited in the present disclosure according to various embodiments thereof.

Further, in the light-guiding body 101 depicted in FIG. 3A, the plurality of protruding stripes 101a may be straight protruding stripes, arranged to be parallel to one another.

In various embodiments of the present disclosure, the protruding stripes may also have other suitable shapes. For example, a protruding stripe may have a zigzag shape or a curved shape along its length direction. A protruding stripe may also be formed by two or more small protruding stripes connected together. In this case, the end of a first smaller protruding stripe may be connected to the head of a second smaller protruding stripe, and so on and so forth. The two connected small protruding stripes may be arranged along different longitudinal directions.

Figure 3B:
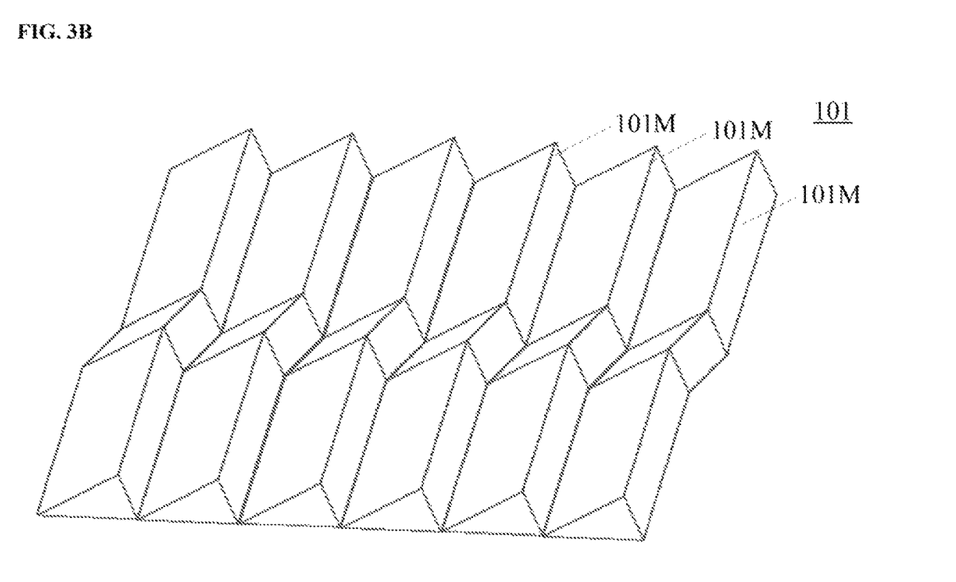
FIG. 3B illustrates an exemplary light-guiding body according to various disclosed embodiments of the present disclosure.

FIG. 3B may be a structure of the disclosed light-guiding body 101. In the light-guiding body 101, a protruding stripe 101M may be a zigzag protruding stripe, e.g., the protruding stripe 101M may have a zigzag shape along the longitudinal direction.

In a light-guiding panel 100 containing zigzag-shaped protruding stripes, a diffuser stripe may also have a zigzag shape, accordingly. In a light-guiding panel 100 containing curved protruding stripes, a diffuser stripe may also have a curved shape, accordingly. In a light-guiding panel 100 containing protruding stripes formed by connected smaller protruding stripes, a diffuser stripe may also be formed by connected smaller diffuser stripes.

Figure 4:
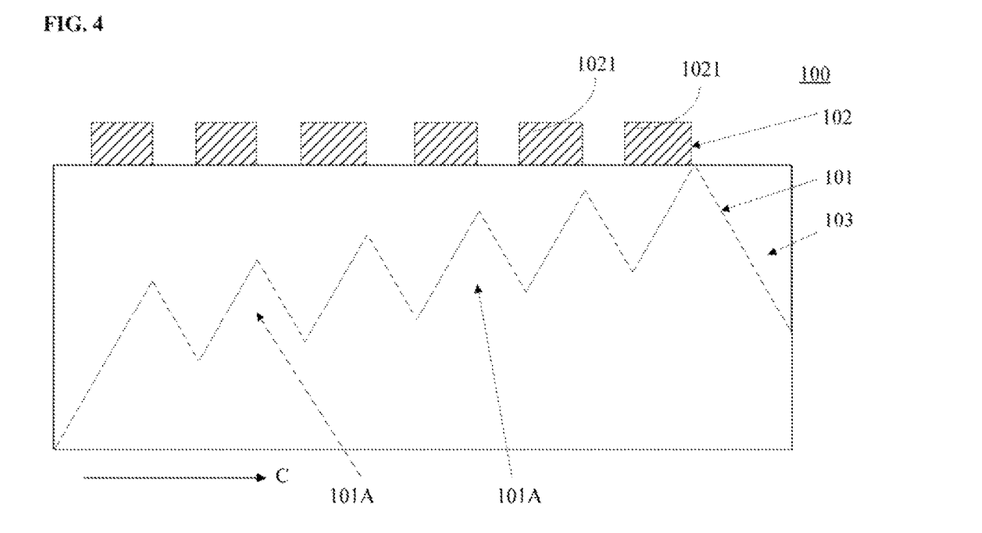
FIG. 4 illustrates another exemplary light-guiding panel according to various disclosed embodiments of the present disclosure.

FIG. 4 illustrates a structure of another disclosed light-guiding panel 100. Compared to the light-guiding panel shown in FIG. 1, the light-guiding panel shown in FIG. 4 may include a plurality of parallel protruding stripes 101A, and the heights of protruding stripes 101A may increase or decrease along an incident direction of the parallel light beams. For example, in FIG. 4, the heights of protruding stripes 101A may increase or decrease along direction C. The heights of protruding stripes 101A may increase or decrease along an incident direction of the parallel light beams, so that parallel light beams incident on a side surface of the light-guiding panel 100 may be incident on the plurality of protruding stripes 101A, and may be further reflected to the top surface of the light-guiding panel 100 by the plurality of protruding stripes 101A. Thus, light emitted by the light-guiding panel 100 may have increased uniformity.

Figure 5:
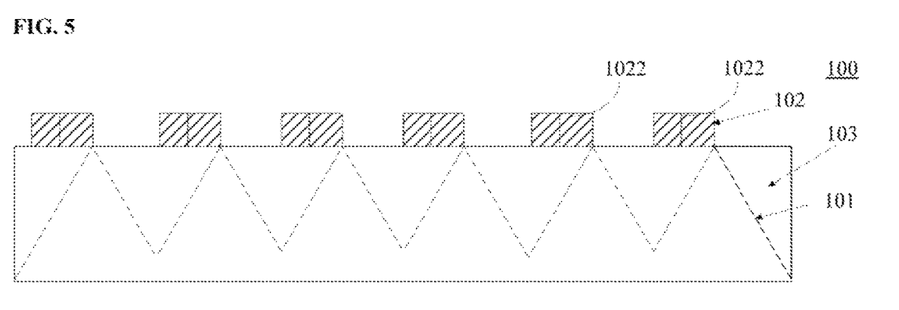
FIG. 5 illustrates another exemplary light-guiding panel according to various disclosed embodiments of the present disclosure.

FIG. 5 illustrates a structure of another disclosed light-guiding panel 100. Compared to the light-guiding panel shown in FIG. 1, the light-guiding panel shown in FIG. 5 may include diffuser stripes 1022 each having at least two multi-stable LC sub-diffuser stripes. The at least two multi-stable LC sub-diffuser stripes may be arranged to be parallel to each other. By using multi-stable LC sub-diffuser stripes to form the diffuser stripe, the transmission and/or scattering of light may be controlled through adjusting the states of the multi-stable LC sub-diffuser stripes.

For example, when the multi-stable LC sub-diffuser stripes are in transparent state, light may be transmitted through the corresponding diffuser stripes; and when the multi-stable LC sub-diffuser stripes are in switch/scattering state, light may be scattered by the corresponding diffuser stripes. Further, because a diffuser stripe 1022 can be formed by two or more multi-stable LC sub-diffuser stripes, when light is being scattered, the total width (or the number) of the multi-stable sub-diffuser stripes in switch state may be adjusted to change the light scattering angle. A greater width may result in a greater scattering angle.

Figure 6:
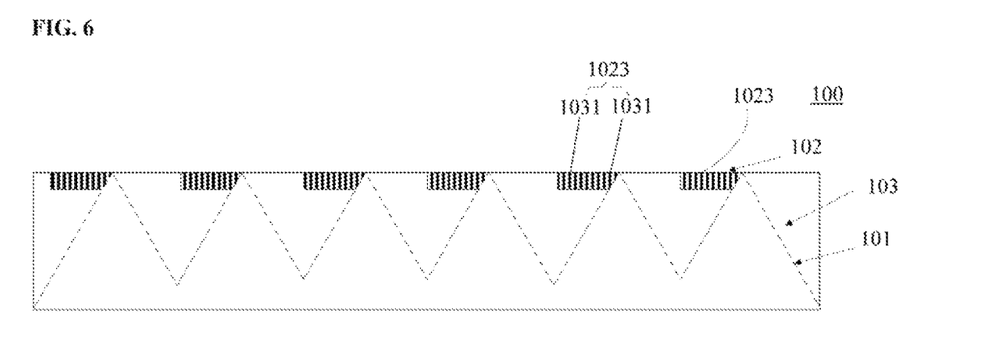
FIG. 6 illustrates another exemplary light-guiding panel according to various disclosed embodiments of the present disclosure.

FIG. 6 illustrates a structure of another disclosed light-guiding panel 100. Compared to the light-guiding panel shown in FIG. 1, the light-guiding panel shown in FIG. 6 may have the following differences. As shown in FIG. 6, a diffuser stripe 1023 may include a plurality of mesh-shaped grooves 1031 arranged in a stripe-shaped region on the light-emitting surface of the filler layer 103. By forming the plurality of mesh-shaped grooves 1031 in a stripe-shaped region on the light-emitting surface, the light-guiding panel 100 may function as a switch glass, and scattering of light may be implemented.

The mesh-shaped grooves 1031 may be formed, e.g., by etching, through precise processing technology. By forming mesh-shaped grooves 1031, the light-guiding panel 100 may function as a switch glass, and scattering of light may be implemented. In one embodiment, the mesh-shaped grooves 1031 may be millimeter-scale grooves. In other various embodiments, the dimensions of the mesh-shaped grooves 1031 may also be different, depending on the applications and/or designs.

In various embodiments, the diffuser stripes in the light diffusing-transmitting layer, such as the diffuser stripes 1021 shown in FIGS. 1, 2A-2B, 4, and 11, the diffuser stripes 1022 shown in FIG. 5, and the diffuser stripes 1023 shown in FIG. 6, may be configured as desired and in accordance with the arrangement of the protruding stripes in the underlying light-guiding body.

For example, each diffuser stripe may be configured to have at least one side surface lined up with a top line of a protruding stripe in an underlying light-guiding body. One side surface corresponds to one protruding stripe. In some embodiments, although not shown in the figures, two adjacent diffuser stripes may be in contact with each other having an interface lined up with a same top line of a protruding stripe. In other embodiments, one diffuser stripe may situate on a top line of a protruding stripe, having a portion over one side of the top line of the protruding stripe and having another portion over another side of the top line.

The diffuser stripes in a same light diffusing-transmitting layer may be substantially the same in dimensions or sometimes, may be different in dimensions. The diffuser stripes in a same light diffusing-transmitting layer may be arranged in an array corresponding to the arrangement of the protruding stripes of the underlying light-guiding layer. In one embodiment, the diffuser stripe may have a width less than a distance between top lines of adjacent protruding stripe. In another embodiment, the diffuser stripe may have a width greater than a distance between top lines of adjacent protruding stripe. In yet another embodiment, in a same light diffusing-transmitting layer, some of the diffuser stripes may have a width greater than a distance between top lines of adjacent protruding stripe, and some of the diffuser stripes may have a width less than the distance between top lines of adjacent protruding stripe.

Figure 7:
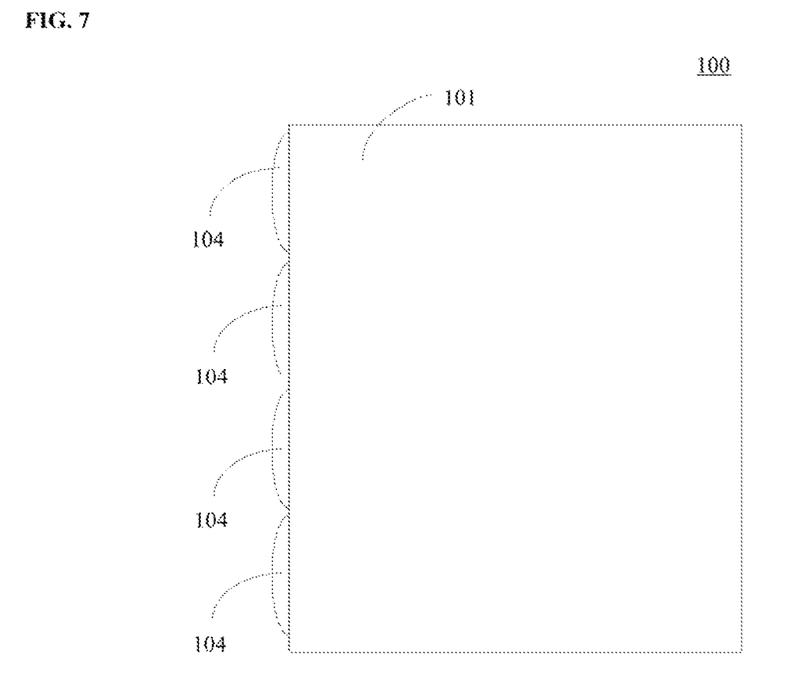
FIG. 7 illustrates another exemplary light-guiding panel according to various disclosed embodiments of the present disclosure.

FIG. 7 illustrates a structure of another disclosed light-guiding panel 100. Compared to the light-guiding panel shown in FIG. 1, the light-guiding panel shown in FIG. 7 may have the following differences. For example, the light-guiding panel 100 may further include a plurality of lens structures 104 arranged on a side surface of the light-guiding body 101. By arranging the lens structures 104, light emitted by the backlight source may be converted to parallel light beams incident on the light-guiding panel 100. The structure of the backlight source may be described, e.g., in FIGS. 8 and 9.

Figure 8:
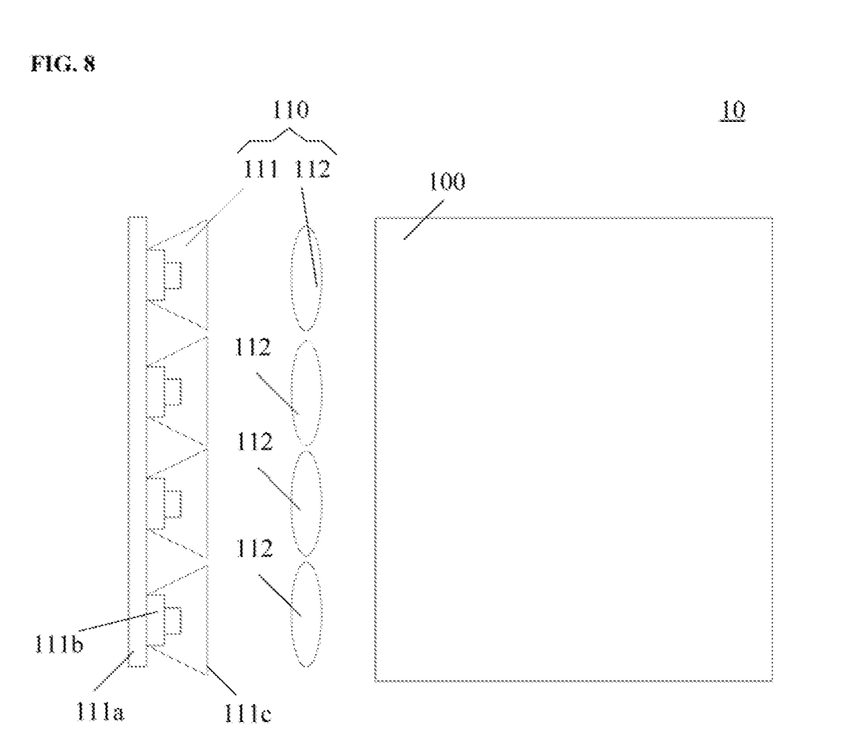
FIG. 8 illustrates an exemplary backlight module according to various disclosed embodiments of the present disclosure.

FIG. 8 illustrates a structure of a backlight module 10 provided by the present disclosure. The backlight module 10 may include a backlight source 110 and a light-guiding panel 100. The light-guiding panel 100 may be any one of the light-guiding panel 100 shown in FIGS. 1-6.

By disposing a light diffusing-transmitting layer on the light-guiding body, parallel light beams incident on a side surface of the light-guiding body may be reflected or directed to the light diffusing-transmitting layer. The light diffusing-transmitting layer may include a plurality of separately arranged diffuser stripes. The diffuser stripes may be parallel to one another and adjacent diffuser stripes may be separated by a spacing. In some embodiments, by reflecting the parallel light beams to the diffuser stripes or to the spacing between adjacent diffuser stripes, the parallel light beams may be processed differently such that collimated light beams and non-collimated light beams may be emitted by the light-guiding body. In this way, the viewing angle range of the display device may be adjusted. In some other embodiments, parallel light beams incident on a side surface of the light-guiding body may be reflected or directed to the diffuser stripes, and may be processed different by the diffuser stripes in the light diffusing-transmitting layer. Accordingly, collimated light beams and non-collimated light beams may be emitted by the light-guiding body. In this way, the viewing angle range of the display device may be adjusted. In the described structures for adjusting the viewing angle range of the display device, the light diffusing-transmitting layer may be formed by separately arranged diffuser stripes. Compared to conventional technology, the disclosed light diffusing-transmitting layer has a smaller total area and is cheaper to fabricate.

As shown in FIG. 8, the backlight source 110 may include a first lighting bar 111 arranged on one side of the light-guiding panel 100 and a plurality of optical members 112. The optical members 112 may convert the light emitted by the first lighting bar 111 to parallel light beams that are incident on a side surface of the light-guiding body 101. As described previously, the reflective structure 1011 in the light-guiding panel 100 may include a plurality of protruding stripes 101a arranged in parallel along an incident direction of the parallel light beams. A protruding stripe 101a may include a first sloped surface 101b. The first sloped surface 101b may reflect parallel light beams incident on a side surface of the light-guiding body 101 to one or more corresponding diffuser stripes 1021 (or 1022, 1023). In some embodiments, the first sloped surface 101b may also reflect parallel light beams incident on a side surface of the light-guiding body 101 to the spacing between two adjacent diffuser stripes 1021. In one embodiment, only one lighting stripe may be arranged and the cost to fabricate the backlight source 110 may be reduced.

The first lighting bar 111 may include a printed circuit board (PCB) 111a, a plurality of light-emitting diode (LED) chips disposed on the PCB 111a, and a plurality of reflective cups 111c disposed over the LED chips 111b. The reflective cups 111c may reflect or direct the light emitted by the LED chips 111b to the optical members 1112 such that parallel light beams may be emitted from the optical members 112.

Figure 9:
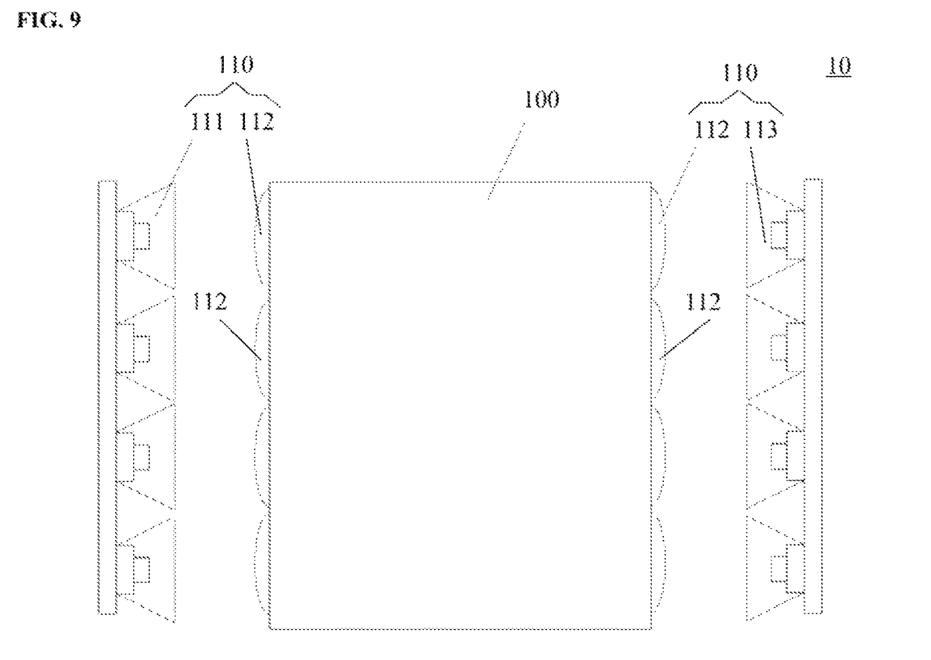
FIG. 9 illustrates another exemplary backlight module according to various disclosed embodiments of the present disclosure.

FIG. 9 illustrates another structure of a backlight module 10 provided by the present disclosure. Compared to the backlight module 10 shown in FIG. 8, the backlight module 10 illustrated in FIG. 9 may include the following differences. For example, the backlight source 110 shown in FIG. 9 may include a second lighting bar 113 arranged on another side surface of the light-guiding body 101, and optical members 112 used for converting or directing the light emitted by the second lighting bar 113 to parallel light beams that are incident on the other side surface of the light-guiding body 101.

As disclosed herein, a protruding stripe 101a may further include a second sloped surface 101c. The second sloped surface 101c may reflect parallel light beams incident on the other side surface of the light-guiding body 101 to the space between two adjacent diffuser stripes 1021. A first sloped surface 101b and a second sloped surface 101c may be arranged on two opposite sides of a protruding stripe 101a. In one embodiment, by arranging two lighting bar, light emitted by the two lighting bar may be incident on different locations of the diffuser stripe 102 through the light-guiding body 101. Thus, switching between collimated light beam and non-collimated light beam, in the backlight module 10, may be implemented by controlling the lighting bar, e.g., switching between the two lighting bar.

Figure 10:
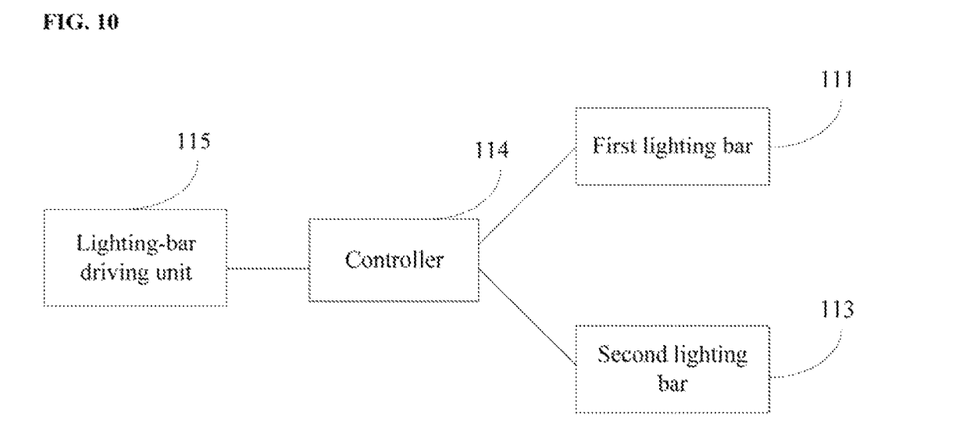
FIG. 10 illustrates an exemplary block diagram of the backlight module depicted in FIG. 9 according to various disclosed embodiments of the present disclosure.

FIG. 10 illustrates an exemplary block diagram of the backlight module illustrated in FIG. 9. As shown in FIG. 9, the backlight module 10 may include a first lighting bar 111, a second lighting bar 113, a controller 114, and a lighting-bar driving unit 115. The controller 114 may be configured to receive control signals, and control the on and off states of the first lighting bar 111 and the second lighting bar 113 based on the control signals. By controlling the on and off states of the lighting bar, switching between collimated light beam and non-collimated light beam may be implemented.

The lighting-bar driving unit 115 may drive the first lighting bar 111 and the second lighting bar 113 to function. The lighting-bar driving unit 115 may include proper circuitry to provide sufficient voltage/current for controlling the on/off states of the lighting bar. The controller 114 may be disposed between the lighting-bar driving unit 115 and the lighting bar, i.e., the first lighting bar 111 or the second lighting bar 113, to function as a switch.

In some other embodiments, when a diffuser stripe 1021 includes a multi-stable LC diffuser stripe, or when a diffuser stripe 1022 includes at least two multi-stable LC diffuser stripes arranged parallel to one another, the controller 114 may be electrically coupled/connected to the multi-stable LC diffuser stripes. The controller 114 may control the state, i.e., transparent state or scattering state, of the multi-stable LC diffuser stripes based a control signal. By controlling the multi-stable LC diffuser stripes to be in transparent state or scattering state, the light emitted by the backlight module 10 may switch between collimated light beam and non-collimated light beam, and the scattering angle of the non-collimated light beam may be controlled. The viewing angle range of the display device may be controlled and adjusted.

In some embodiments, a control signal may include, but may not be limited, to an infrared signal, a Bluetooth signal, and a key signal. For example, when the display device, containing the disclosed backlight module, is in use, the controller 114 may receive the control signal, sent through a remote and/or a panel button/key by the user, and turn on the first lighting bar 111 and/or the second lighting bar 113 based on the control signal. In some other embodiments, the controller 114 may control the multi-state LC diffuser stripes to be at transparent state or scattering state based on the control signal. Thus, wide viewing angle range or narrow viewing angle range of the display device may be implemented.

As shown in FIG. 8, the optical members 112 may be lenses or other suitable means. As shown in FIG. 9, the optical members 112 may be lens structures disposed on a side surface of the light-guiding boy 101. The lenses or lens structures 104 may convert light emitted by the backlight source 110 to be parallel light beams.

Another aspect of the present disclosure provides a display device. The display device may include a backlight module, illustrated in FIGS. 8 and 9, and a display panel.

The display panel may be any suitable display panels such as LC display panels.

The disclosed display device may be any of a mobile phone, a tablet computer, a television, a display panel, a laptop computer, a digital photo frame, a navigation device, or any other products or parts with display functions.

Figure 11:
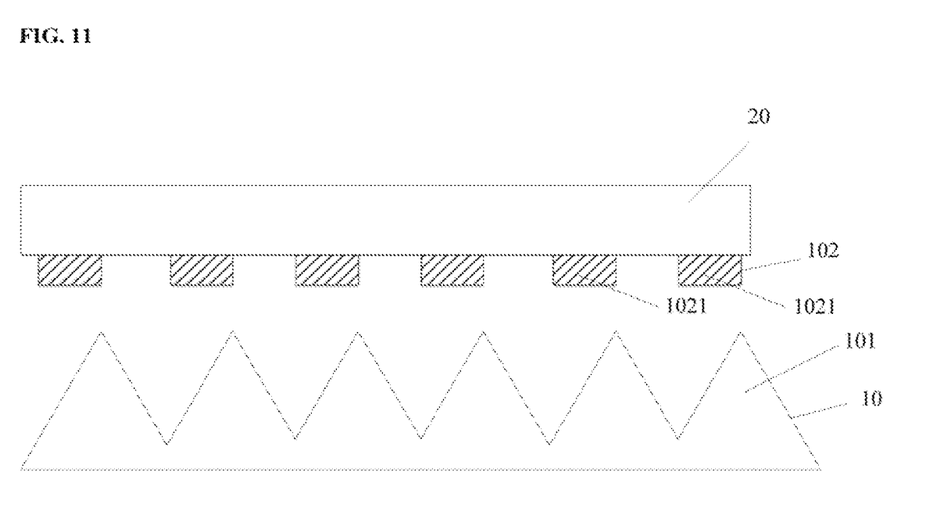
FIG. 11 illustrates an exemplary display device according to various disclosed embodiments of the present disclosure.

FIG. 11 illustrates a structure of an exemplary display device provided by the present disclosure. As shown in FIG. 11, the display device may include a backlight module 10 and a display panel. The backlight module 10 may include a light-guiding panel 100. The light-guiding panel 100 may include a light-guiding body 101. A light diffusing-transmitting layer 102 may be disposed on the display panel 20 on the side facing the backlight module 10. The light diffusing-transmitting layer 102 may include a plurality of separately arranged diffuser stripes 1021 (or the diffuser stripes 1022 described previously).

The light-guiding body 101 may reflect the parallel light beams incident on a side surface of the light-guiding body 101 to the light diffusing-transmitting layer 102. The diffuser stripes 1021 may diffuser/scatter the reflected parallel light beams or transmit the reflected parallel light beams when illuminated by the reflected parallel light beams. The spacing between adjacent diffuser stripes 1021 may allow the reflected parallel light beams to be transmitted there-through when illuminated by the reflected parallel light beams.

The disclosed display device may be any of a mobile phone, a tablet computer, a television, a display panel, a laptop computer, a digital photo frame, a navigation device, or any other products or parts with display functions.

Figure 12:
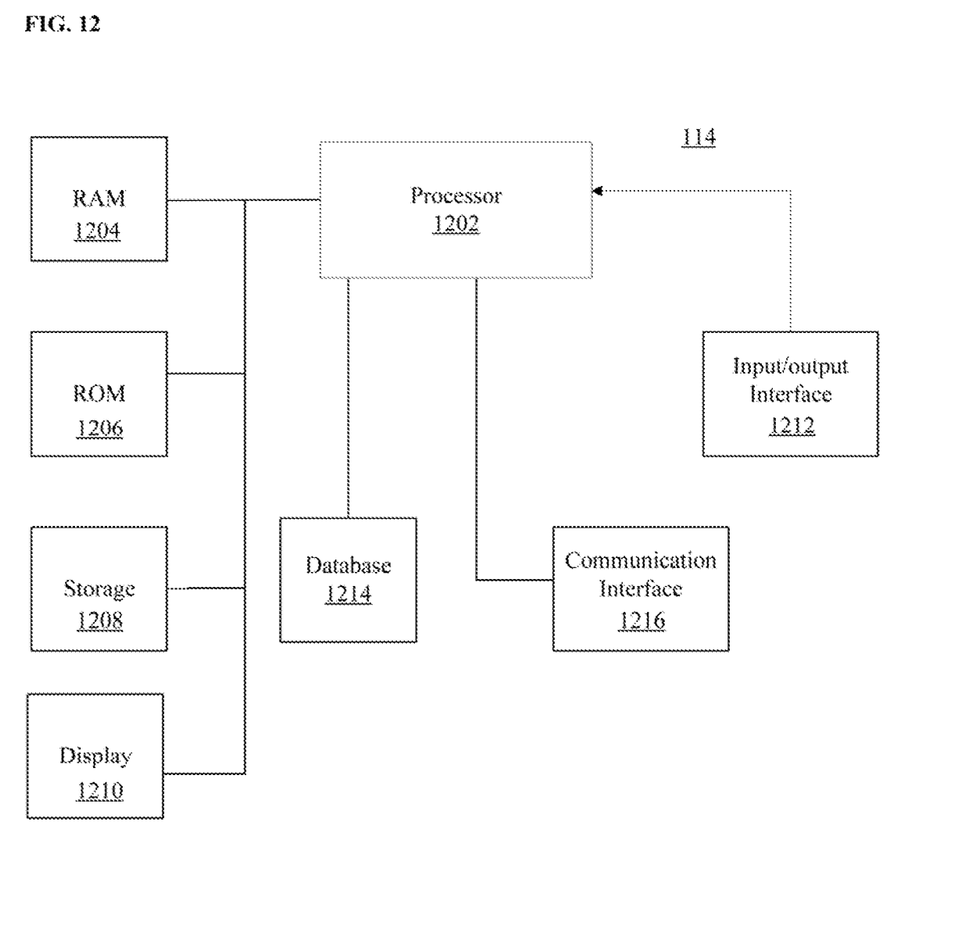
FIG. 12 illustrates a block diagram of a controller according to various disclosed embodiments of the present disclosure.

FIG. 12 illustrates a block diagram of the controller used in various disclosed embodiments of the present disclosure.

The controller 114 may receive, process, and execute commands from the display apparatus. The controller 114 may include any appropriately configured computer system. As shown in FIG. 12, controller 114 may include a processor 1202, a random access memory (RAM) 1204, a read-only memory (ROM) 1206, a storage 1208, a display 1210, an input/output interface 1212, a database 1214; and a communication interface 1216. Other components may be added and certain devices may be removed without departing from the principles of the disclosed embodiments.

Processor 1202 may include any appropriate type of general purpose microprocessor, digital signal processor or microcontroller, and application specific integrated circuit (ASIC). Processor 1202 may execute sequences of computer program instructions to perform various processes associated with controller 114. Computer program instructions may be loaded into RAM 1204 for execution by processor 1202 from read-only memory 1206, or from storage 1208. Storage 1208 may include any appropriate type of mass storage provided to store any type of information that processor 1202 may need to perform the processes. For example, storage 1208 may include one or more hard disk devices, optical disk devices, flash disks, or other storage devices to provide storage space.

Display 1210 may provide information to a user or users of the controller 114. Display 1210 may include any appropriate type of computer display device or electronic device display (e.g., CRT or LCD based devices). Input/output interface 1212 may be provided for users to input information into controller 114 or for the users to receive information from controller 114. For example, input/output interface 1212 may include any appropriate input device, such as a keyboard, a mouse, an electronic tablet, voice communication devices, touch screens, or any other optical or wireless input devices. Further, input/output interface 1212 may receive from and/or send to other external devices.

Further, database 1214 may include any type of commercial or customized database, and may also include analysis tools for analyzing the information in the databases. Database 1214 may be used for storing information for semiconductor manufacturing and other related information. Communication interface 1216 may provide communication connections such that controller 114 may be accessed remotely and/or communicate with other systems through computer networks or other communication networks via various communication protocols, such as transmission control protocol/internet protocol (TCP/IP), hyper text transfer protocol (HTTP), etc.

In one embodiment, a user may input commands on the input/output interface 1212 to change the viewing angle. The processor 1202 may receive, process, and execute the commands to adjust the viewing angle to be wider or narrower. The communication interface may be coupled to the first lighting bar 111 and the second lighting bar 113 to control the on and off states of the first lighting bar 111 and the second lighting bar 113. In one embodiment, the controller 114 may also be configured to control the scattering state and/or transparent state of the multi-stable LC diffuser stripes. The result of changing the viewing angle can be returned to the user via the display 1210 or the input/output interface 1212.

By disposing a light diffusing-transmitting layer on the light-guiding body, parallel light beams incident on a side surface of the light-guiding body may be reflected or directed to the light diffusing-transmitting layer. The light diffusing-transmitting layer may include a plurality of separately arranged diffuser stripes. The diffuser stripes may be parallel to one another and adjacent diffuser stripes may be separated by a distance. In some embodiments, by reflecting the parallel light beams to the diffuser stripes or to the space between adjacent diffuser stripes, the parallel light beams may be processed differently such that collimated light beams and non-collimated light-beams may be emitted by the light-guiding body. In this way, the viewing angle of the display device may be adjusted. In some other embodiments, parallel light beams incident on a side surface of the light-guiding body may be reflected or directed to the diffuser stripes, and may be processed different by the diffuser stripes in the light diffusing-transmitting layer. Accordingly, collimated light beams and non-collimated light-beams may be emitted by the light-guiding body. In this way, the viewing angle of the display device may be adjusted. In the described structures for adjusting the viewing angle of the display device, the light diffusing-transmitting layer may be formed by separately arranged diffuser stripes. Compared to conventional technology, the disclosed light diffusing-transmitting layer has a smaller total area and is cheaper to fabricate.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated.

Therefore, the term "the disclosure", "the present disclosure" or the like does not necessarily limit the claim scope to a specific embodiment, and the reference to exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A light-guiding panel, comprising:
a light-guiding body; and
a light diffusing-transmitting layer over the light-guiding body, wherein:
the light-guiding body is configured to reflect incident light beams on a first side surface of the light-guiding body, thereby providing reflected light beams to the light diffusing-transmitting layer, and
the light diffusing-transmitting layer is capable of diffusing and transmitting the reflected light beams;
when the incident light beams on the light-guiding body are substantially parallel, the reflected light beams from the light-guiding body are substantially parallel; and
the light diffusing-transmitting layer comprises:
a plurality of diffuser stripes, configured to scatter a portion of the reflected substantially parallel light beams to form non-collimated light beams, and
a spacing between adjacent diffuser stripes, configured to transmit a portion of the reflected substantially parallel light beams to form collimated light beams.

2. The light-guiding panel according to claim 1, wherein: the diffuser stripe has one of a straight shape and a zigzag shape.

3. The light-guiding panel according to claim 1, wherein: a light-emitting surface of the light-guiding body includes a reflective structure, the reflective structure includes a plurality of protruding stripes arranged in parallel along an incident direction of the incident light beams, and the protruding stripe includes a first sloped surface configured for reflecting the incident light beams to the diffuser stripes.

4. The light-guiding panel according to claim 3, wherein: heights of the plurality of protruding stripes alter along the incident direction of the incident light beams.

5. The light-guiding panel according to claim 3, wherein: the protruding stripe includes a second sloped surface configured to reflect incident light beams, incident on a second side surface thereof, to the spacing between adjacent diffuser stripes, and the first sloped surface and the second sloped surface are arranged on opposite sides of the protruding stripe.

6. The light-guiding panel according to claim 1, further comprising: a filler layer over the light-guiding body, wherein the plurality of diffuser stripes is disposed on the filler layer.

7. The light-guiding panel according to claim 6, wherein: the diffuser stripe includes at least one multi-stable liquid crystal (LC) diffuser stripe, the at least one multi-stable LC diffuser stripe being arranged in parallel with one another.

8. The light-guiding panel according to claim 6, wherein the diffuser stripe includes a plurality of mesh-shaped grooves arranged in a stripe-shaped region on a light-emitting surface of the filler layer.

9. The light-guiding panel according to claim 1, further comprising: a plurality of lens structures arranged on a side of the light-guiding body.

10. A backlight module, comprising the light-guiding panel according to claim 1.

11. The backlight module according to claim 10, further comprising: a first lighting bar on one side of the light-guiding panel, and a plurality of optical members, configured to convert light emitted from the first lighting bar to be substantially parallel, incident on the first side surface of the light-guiding body.

12. The backlight module according to claim 11, further comprising: a second lighting bar on another side of the light-guiding panel, and a plurality of optical members, configured to convert light emitted by the second lighting bar to be substantially parallel, incident on a second side surface of the light-guiding body,
wherein: a light-emitting surface of the light-guiding body includes a reflective structure including a protruding stripe, the protruding stripe including a sloped surface configured to reflect the incident light beams, incident on the second side surface of the light-guiding body to a spacing between adjacent diffuser stripes.

13. The backlight module according to claim 12, further comprising:
a controller, configured to receive a control signal, the control signal being configured to control on and off states of the first lighting bar and the second lighting bar.

14. The backlight module according to claim 13, further comprising: a filler layer over the light-guiding body to provide a substantially flat surface for the plurality of diffuser stripes to be disposed thereon.

15. The backlight module according to claim 14, wherein the diffuser stripe includes at least one multi-stable liquid crystal (LC) diffuser stripe, the at least one multi-stable LC diffuser stripe being arranged in parallel with one another.

16. The backlight module according to claim 15, wherein the controller is configured to control the diffuser stripe to switch between a transparent state and a scattering state.

17. A display device, comprising the backlight module according to claim 10.

18. The backlight module according to claim 11, wherein the optical members are lens structures arranged on one side surface of the light-guiding body.

19. The backlight module according to claim 14, wherein the diffuser stripe includes a plurality of mesh-shaped grooves arranged in a stripe-shaped region on a light-emitting surface of the filler layer.

\* \* \* \* \*